US012644546B2

(12) United States Patent
Belen et al.

(10) Patent No.: US 12,644,546 B2
(45) Date of Patent: Jun. 2, 2026

(54) HOOKED PIPE COUPLING

(71) Applicant: ASC Engineered Solutions, LLC, Portsmouth, NH (US)

(72) Inventors: Jordan Cameron Belen, West Warwick, RI (US); Stephen Eric Scott, North Kingstown, RI (US); Matthew William McNamara, Portsmouth, RI (US)

(73) Assignee: ASC ENGINEERED SOLUTIONS, LLC, Oak Brook, IL (US)

( * ) Notice: Subject to any disclaimer, the term of this patent is extended or adjusted under 35 U.S.C. 154(b) by 0 days.

(21) Appl. No.: 18/228,598

(22) Filed: Jul. 31, 2023

(65) Prior Publication Data

US 2023/0408005 A1 Dec. 21, 2023

Related U.S. Application Data

(63) Continuation of application No. 17/889,073, filed on Aug. 16, 2022, now Pat. No. 11,828,392, which is a
(Continued)

(51) Int. Cl.
F16L 21/06 (2006.01)
F16L 17/04 (2006.01)
(Continued)

(52) U.S. Cl.
CPC ............. F16L 21/065 (2013.01); F16L 17/04 (2013.01); *F16L 19/0656* (2013.01); *F16L 47/04* (2013.01)

(58) Field of Classification Search
CPC ......... F16L 17/04; F16L 21/06; F16L 21/065; F16L 23/08; F16L 23/10
See application file for complete search history.

(56) References Cited

U.S. PATENT DOCUMENTS 1,541,601 A 6/1925 Tribe
1,928,316 A 9/1933 Muto
(Continued)

FOREIGN PATENT DOCUMENTS

CA 2298364 A1 * 8/2000 ............. F16L 17/04
DE 10006029 8/2001
(Continued)

OTHER PUBLICATIONS

Belen, Jordan Cameron; Final Office Action for U.S. Appl. No. 16/126,280, filed Sep. 10, 2018, mailed Apr. 27, 2022, 17 pgs.
(Continued)

*Primary Examiner* — Matthew Troutman
*Assistant Examiner* — Alexander T Rufrano
(74) *Attorney, Agent, or Firm* — McAndrews, Held & Malloy, Ltd.

(57) ABSTRACT

A hooked pipe coupling includes a first pipe coupling segment comprising a first arcuate body portion defining a first end and a second end opposite the first end, a first hook extending from the first end, and a first fastener lug extending from the second end, the first arcuate body portion defining a first sloped ledge surface; and a second pipe coupling segment comprising a second arcuate body portion defining a third end and a fourth end opposite the third end, a second hook extending from the third end, and a second fastener lug extending from the fourth end, the second arcuate body portion defining a second sloped ledge surface; wherein the first sloped ledge surface presses against the second sloped ledge surface in a tightened configuration of the hooked pipe coupling to prevent axial movement of the first pipe coupling segment relative to the second pipe coupling segment.

8 Claims, 10 Drawing Sheets

Related U.S. Application Data continuation of application No. 16/146,204, filed on Sep. 28, 2018, now Pat. No. 11,448,346.

(51) Int. Cl.
  *F16L 19/065*          (2006.01)
  *F16L 47/04*           (2006.01)

(56)                References Cited

U.S. PATENT DOCUMENTS

| | | | |
|---|---|---|---|
| 2,451,354 | A | 10/1948 | Ohls |
| 4,373,235 | A | 2/1983 | Korgaonkar |
| 4,454,644 | A | 6/1984 | Okazaki et al. |
| 4,611,839 | A | 9/1986 | Rung et al. |
| 4,639,020 | A | 1/1987 | Rung et al. |
| 4,896,902 | A | 1/1990 | Weston |
| 4,915,418 | A * | 4/1990 | Palatchy ................. F16L 17/04 |
| | | | 285/411 |
| 4,940,261 | A * | 7/1990 | Somers Vine .......... F16L 17/04 |
| | | | 285/112 |
| 5,018,768 | A | 5/1991 | Palatchy |
| 5,282,654 | A | 2/1994 | Hendrickson |
| 5,380,052 | A | 1/1995 | Hendrickson |
| 5,498,042 | A | 3/1996 | Dole |
| 5,570,499 | A | 11/1996 | Katayama et al. |
| 5,758,907 | A | 6/1998 | Dole et al. |
| 6,056,332 | A | 5/2000 | Foster |
| 6,464,268 | B1 | 10/2002 | Hough et al. |
| 6,533,333 | B1 * | 3/2003 | Radzik ................... F16L 23/08 |
| | | | 285/411 |
| 6,626,466 | B1 * | 9/2003 | Dole ....................... F16L 21/06 |
| | | | 285/364 |
| 7,086,131 | B2 | 8/2006 | Gibb et al. |
| D577,423 | S | 9/2008 | Dole |
| D597,635 | S | 8/2009 | Dole |
| 7,644,960 | B2 | 1/2010 | Casey, Sr. et al. |
| 7,712,796 | B2 | 5/2010 | Gibb et al. |
| 7,789,434 | B2 | 9/2010 | Nagle et al. |
| 8,282,136 | B2 | 10/2012 | Vandal et al. |
| 8,424,918 | B2 | 4/2013 | Gibb et al. |
| 8,517,430 | B2 | 8/2013 | Dole et al. |
| 8,608,179 | B2 | 12/2013 | King et al. |
| 8,733,799 | B2 | 5/2014 | Gibb et al. |
| 9,151,422 | B2 | 10/2015 | Kayacik et al. |
| 9,273,706 | B2 | 3/2016 | Rigollet et al. |
| 9,359,024 | B2 | 6/2016 | Meyer et al. |
| 9,388,922 | B2 | 7/2016 | Dole |
| 9,395,024 | B2 | 7/2016 | Bancroft et al. |
| 9,435,469 | B2 | 9/2016 | Bancroft et al. |
| 9,518,684 | B2 | 12/2016 | Juzak et al. |
| 9,651,179 | B2 | 5/2017 | Krueger et al. |
| 9,726,310 | B2 | 8/2017 | Gibb et al. |
| 9,863,564 | B2 | 1/2018 | Sato |
| D823,443 | S | 7/2018 | Bancroft et al. |
| D856,123 | S | 8/2019 | Bancroft et al. |
| D876,944 | S | 3/2020 | Fleck et al. |
| D889,611 | S | 7/2020 | Lippka |
| 10,851,928 | B1 | 12/2020 | Lu et al. |
| 11,448,346 | B2 | 9/2022 | Belen et al. |
| 11,821,548 | B2 | 11/2023 | Belen et al. |
| 11,828,392 | B2 | 11/2023 | Belen et al. |
| 2006/0267343 | A1 | 11/2006 | Wright |
| 2008/0197627 | A1 | 8/2008 | Baudoin et al. |
| 2008/0284159 | A1 | 11/2008 | Krehl |
| 2010/0320217 | A1 | 12/2010 | Okawachi et al. |
| 2011/0089688 | A1 | 4/2011 | Nahmias |
| 2013/0187345 | A1 | 7/2013 | Beagan, Jr. |
| 2015/0176728 | A1 | 6/2015 | Bowman |
| 2016/0319968 | A1 | 11/2016 | Bancroft et al. |
| 2017/0321828 | A1 | 11/2017 | Gibb et al. |
| 2017/0328500 | A1 | 11/2017 | Bowman et al. |
| 2018/0135786 | A1 | 5/2018 | Bourbon et al. |
| 2018/0163905 | A1 | 6/2018 | Ohnemus et al. |
| 2018/0163906 | A1 | 6/2018 | Ohnemus et al. |
| 2019/0017635 | A1 | 1/2019 | Belen et al. |
| 2019/0078710 | A1 | 3/2019 | Nishijima et al. |
| 2019/0211953 | A1 | 7/2019 | Lecbych et al. |
| 2020/0049285 | A1 | 2/2020 | Lee |
| 2020/0088330 | A1 | 3/2020 | Lippka |
| 2020/0103062 | A1 | 4/2020 | Belen |
| 2022/0390048 | A1 | 12/2022 | Belen et al. |
| 2024/0068605 | A1 | 2/2024 | Ohnemus et al. |

FOREIGN PATENT DOCUMENTS

| | | | | |
|---|---|---|---|---|
| DE | 102015109127 | | 12/2016 | |
| EP | 1840439 | | 10/2007 | |
| FR | 2237111 | | 4/1976 | |
| GB | 2098297 | A * | 1/1982 | ........... F16L 21/005 |
| GB | 2098297 | | 11/1982 | |
| GB | 2211255 | | 6/1989 | |
| GB | 2218768 | | 11/1989 | |
| GB | 2490598 | | 11/2012 | |
| JP | H03272387 | | 12/1991 | |
| KR | 100209981 | | 7/1999 | |
| KR | 20160086657 | | 7/2016 | |
| KR | 20160086657 | A * | 7/2016 | |
| WO | 2020011499 | | 1/2020 | |
| WO | 2020183480 | | 9/2020 | |
| WO | 2020230029 | | 11/2020 | |

OTHER PUBLICATIONS

Belen, Jordan Cameron; Non-Final Office Action for U.S. Appl. No. 16/126,280, filed Sep. 10, 2018, mailed Feb. 17, 2021, 37 pgs.

Belen, Jordan Cameron; Non-Final Office Action for U.S. Appl. No. 16/126,280, filed Sep. 10, 2018, mailed Mar. 8, 2023, 26 pgs.

Belen, Jordan Cameron; Non-Final Office Action for U.S. Appl. No. 16/126,280, filed Sep. 10, 2018, mailed Sep. 29, 2021, 29 pgs.

Belen, Jordan Cameron; Notice of Allowance for U.S. Appl. No. 16/126,280, filed Sep. 10, 2018, mailed Jul. 11, 2023, 5 pgs.

Belen, Jordan Cameron; Requirement for Restriction/Election for U.S. Appl. No. 16/126,280, filed Sep. 10, 2018, mailed Sep. 18, 2020, 9 pgs.

Victaulic; I-100 Field Installation Handbook, Copyright 2012, 312 pgs.

Belen, Jordan Cameron; Advisory Action for U.S. Appl. No. 16/146,204, filed Sep. 28, 2018, mailed May 12, 2021, 8 pgs.

Belen, Jordan Cameron; Final Office Action for U.S. Appl. No. 16/146,204, filed Sep. 28, 2018, mailed Jan. 7, 2021, 31 pgs.

Belen, Jordan Cameron; Final Office Action for U.S. Appl. No. 16/146,204, filed Sep. 28, 2018, mailed Mar. 28, 2022, 13 pgs.

Belen, Jordan Cameron; Non-Final Office Action for U.S. Appl. No. 16/146,204, filed Sep. 28, 2018, mailed Oct. 13, 2020, 37 pgs.

Belen, Jordan Cameron; Non-Final Office Action for U.S. Appl. No. 16/146,204, filed Sep. 28, 2018, mailed Sep. 2, 2021, 32 pgs.

Belen, Jordan Cameron; Notice of Allowance for U.S. Appl. No. 16/146,204, filed Sep. 28, 2018, mailed Jun. 13, 2022, 8 pgs.

Belen, Jordan Cameron; Non-Final Office Action for U.S. Appl. No. 17/889,073, filed Aug. 16, 2022, mailed Jan. 12, 2023, 26 pgs.

Belen, Jordan Cameron; Notice of Allowance for U.S. Appl. No. 17/889,073, filed Aug. 16, 2022, mailed May 24, 2023, 5 pgs.

* cited by examiner

HOOKED PIPE COUPLING

CROSS-REFERENCE TO RELATED APPLICATIONS

The present application is a continuation of U.S. application Ser. No. 17/889,073, filed Aug. 16, 2022, which is a continuation of U.S. application Ser. No. 16/146,204, filed Sep. 28, 2018, which issued as U.S. Pat. No. 11,448,346 on Sep. 20, 2022, each of which is hereby specifically incorporated by reference herein in its entirety.

TECHNICAL FIELD

This disclosure relates to pipe couplings. More specifically, this disclosure relates to a pipe coupling comprising a pair of hooked coupling segments.

BACKGROUND

Pipe couplings are used to secure a first pipe element to a second pipe element. Examples of pipe elements can include pipes, nipples, valves, elbows, caps, and the like. Typically, a pipe coupling comprises a pair of coupling segments defining a first end, a second end, and a central section therebetween. A gasket is commonly held between the coupling segments. The first ends of the coupling segments can be secured together by a first fastener and the second ends of the coupling segments can be secured together by a second fastener. The first and second fasteners often are bolts and nuts.

It can be difficult and time-consuming for a single worker to assemble the pipe coupling with the first and second pipe elements. The worker commonly must manipulate the pair of unconnected or loosely connected coupling segments into alignment around the pipe elements and the gasket, and must retain the unconnected (or, in some aspects, loosely connected) segments in alignment and the gasket in sealing engagement with the pipes while fastening the first ends together and then fastening the second ends together. In some instances, multiple workers are needed for assembling the pipe coupling to the pipe elements, potentially resulting in increased labor costs. Furthermore, the fasteners can comprise small pieces, which can easily be lost or dropped, especially when attempting to handle multiple fasteners. Also, the requirement of multiple fasteners can increase the cost of the coupling in material costs and by requiring more complex assembly during manufacture.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is coupling segment comprising an arcuate central portion defining a first end, a second end, a first axial side, and a second axial side; a first end portion defining a shank and a bend, the shank extending from the first end of the arcuate central portion proximate the first axial side, the bend extending from the shank towards the second axial side, the bend defining a proximal end coupled to the shank and a distal end distal from the shank, the bend defining an engagement surface and a bottom surface opposite the engagement surface, the bottom surface lying in a plane, wherein the bottom surface faces away from the coupling segment such that the plane does not intersect the coupling segment; and a second end portion extending from the second end of the arcuate central portion, the second end portion defining an opening.

Also disclosed is a pipe coupling comprising a first coupling segment defining a first arcuate portion, the first arcuate portion defining a first rear axial side and a first front axial side, a first shank extending from the first arcuate portion proximate the first rear axial side, a first bend extending from the first shank in a direction towards the first front axial side, the first bend defining a first engagement surface and a first bottom surface; and a second coupling segment defining a second arcuate portion, the second arcuate portion defining a second rear axial side and a second front axial side, a second shank extending from the second arcuate portion proximate the second rear axial side, a second bend extending from the second shank in a direction towards the second front axial side, the second bend defining a second engagement surface and a second bottom surface; wherein the first bottom surface faces away from the second coupling segment and the second bottom surface faces away from the first coupling segment, and wherein the first engagement surface engages the second engagement surface.

Also disclosed is a method for assembly a pipe coupling, the method comprising providing a first coupling segment, the first coupling segment defining a first arcuate portion, the first arcuate portion defining a first rear axial side and a first front axial side, a first shank extending from the first arcuate portion proximate the first rear axial side, a first bend extending from the first shank in a direction towards the first front axial side, the first bend defining a first engagement surface; providing a second coupling segment, the second coupling segment defining a second arcuate portion, the second arcuate portion defining a second rear axial side and a second front axial side, a second shank extending from the second arcuate portion proximate the second rear axial side, a second bend extending from the second shank in a direction towards the second front axial side, the second bend defining a second engagement surface; engaging the first engagement surface with the second engagement surface; facing the first bottom surface away from the second coupling segment and facing the second bottom surface away from the first coupling segment; inserting a fastener through a first fastener opening of the first coupling segment and a second fastener opening of the second coupling segment; and tightening the fastener to secure the first coupling segment to the second coupling segment.

Also disclosed is a pipe coupling segment comprising an arcuate body portion defining a first end, a second end opposite the first end, a first axial side, and a second axial side opposite the first axial side; a hook extending from the first end of the arcuate body portion, wherein the hook defines a shank portion and a bend portion, the shank portion extending in a substantially radially outward direction from the arcuate body portion and the bend portion extending in a substantially axial direction from the shank portion, the bend portion defining an upper engagement surface, the upper engagement surface defining a sloped portion angled rearwardly towards the shank portion; and a fastener lug extending from the second end of the arcuate body portion.

Also disclosed is a pipe coupling segment comprising an arcuate body portion defining a first end, a second end opposite the first end, a first axial side, and a second axial side opposite the first axial side; a hook extending from the first end of the arcuate body portion, wherein the hook defines a shank portion and a bend portion, the shank portion extending in a substantially radially outward direction from the arcuate body portion and the bend portion extending in a substantially axial direction from the shank portion; a stabilizer rib extending in a substantially radially outward direction from the first end, the stabilizer rib formed monolithically with a bottom side of the hook and configured to support the hook under stress, wherein the bend portion of the hook is disposed radially outward of the stabilizer rib; and a fastener lug extending from the second end of the arcuate body portion.

Moreover, disclosed is a hooked pipe coupling comprising a first pipe coupling segment comprising a first arcuate body portion defining a first end and a second end opposite the first end, a first hook extending from the first end, and a first fastener lug extending from the second end, the first arcuate body portion defining a first sloped ledge surface; and a second pipe coupling segment comprising a second arcuate body portion defining a third end and a fourth end opposite the third end, a second hook extending from the third end, and a second fastener lug extending from the fourth end, the second arcuate body portion defining a second sloped ledge surface; wherein the first sloped ledge surface presses against the second sloped ledge surface in a tightened configuration of the hooked pipe coupling to prevent axial movement of the first pipe coupling segment relative to the second pipe coupling segment.

Also disclosed is a hooked pipe coupling comprising a first pipe coupling segment comprising a first arcuate body portion defining a first end and a second end opposite the first end, a first hook extending from the first end, and a first fastener lug extending from the second end, the first arcuate body portion defining a first contact surface at the first end, proximate to the first hook; and a second pipe coupling segment comprising a second arcuate body portion defining a third end and a fourth end opposite the third end, a second hook extending from the third end and configured to engage the first hook, and a second fastener lug extending from the fourth end, the second arcuate body portion defining a second contact surface at the third end, proximate to the second hook; wherein the first contact surface presses against the second contact surface in a tightened configuration of the hooked pipe coupling to reduce stresses on the first hook and the second hook.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
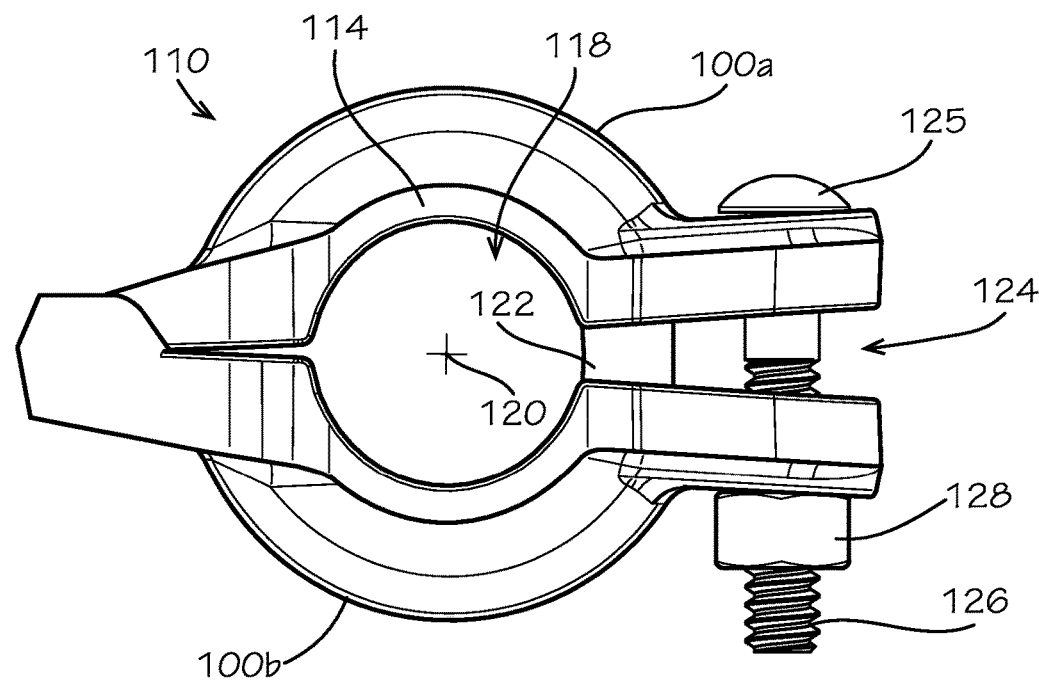
FIG. 1 shows a front view of a pipe coupling comprising a pair of coupling segments in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a pipe coupling and associated methods, systems, devices, and various apparatus. Example aspects of the pipe coupling can comprise a pair of coupling segments. It would be understood by one of skill in the art that the disclosed pipe coupling is described in but a few exemplary aspects among many. No particular terminology or description should be considered limiting on the disclosure or the scope of any claims issuing therefrom.

FIGS. 1-6 illustrate a coupling segment 100 according to a first aspect the present disclosure. As shown in FIG. 1, a pair of the coupling segments 100a,b can be coupled together to form a pipe coupling 110. In other aspects, the pipe coupling 110 can comprise additional coupling segments 100. For example, the coupling segments 100 can be in thirds, wherein three coupling segments 100 are provided, in fourths, wherein four coupling segments 100 are provided, or another other number of coupling segments 100 can be provided.

Figure 5:
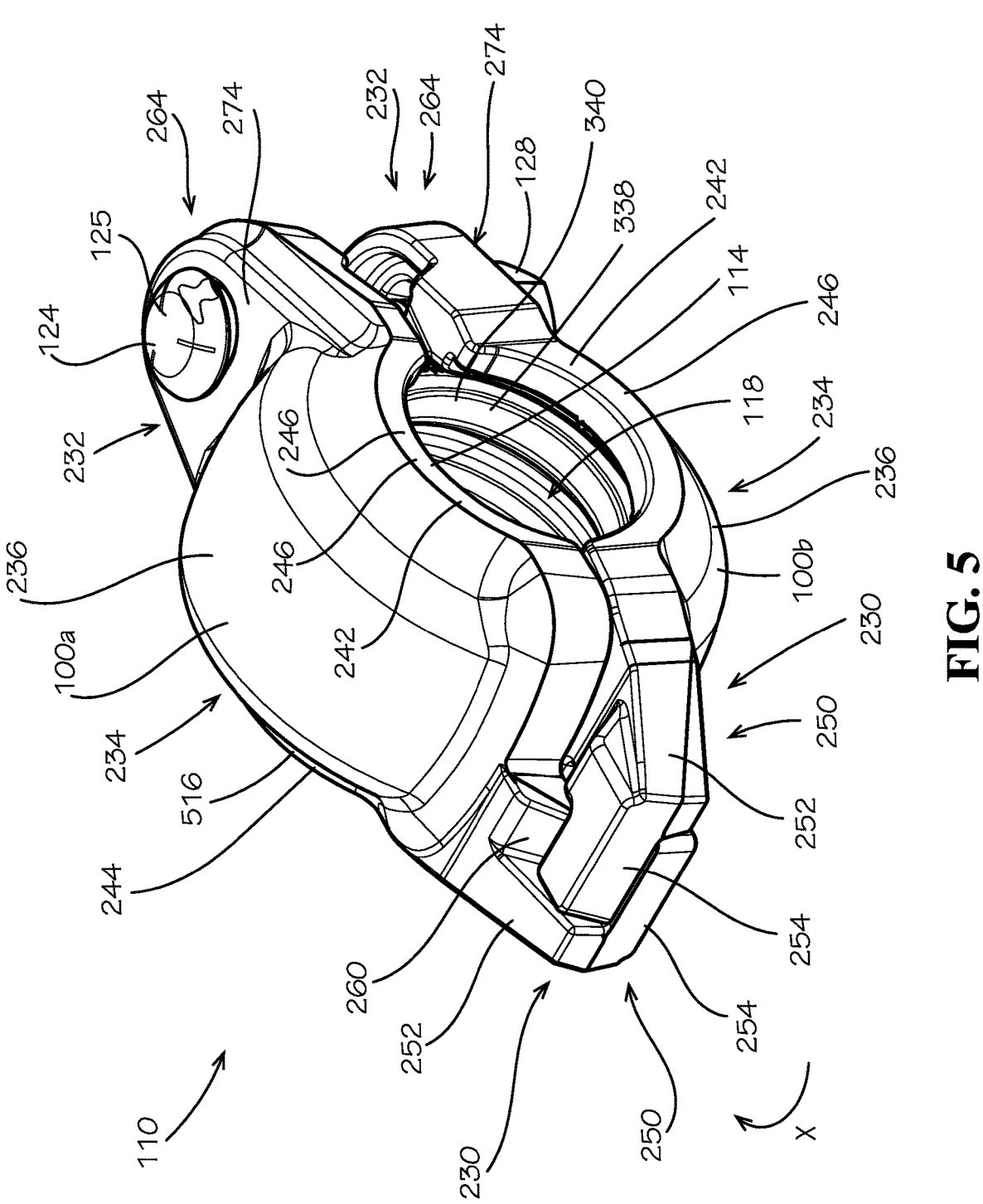
FIG. 5 is a top perspective view of the pipe coupling of FIG. 1.

Example aspects of the pipe coupling 110 can define a first axial side 114 and an opposing second axial side 516 (second axial side 516 shown in FIG. 5). The pipe coupling 110 further can define a coupling void 118 extending through the coupling 110 from the first axial side 114 to the second axial side 516. An axis 120 can be defined through a center of the coupling void 118, as shown. (Axis 120 is going into the page in FIG. 1.) Furthermore, the pipe coupling 110 can comprise a gasket 122 positioned within the void 118. In example aspects, each of the pair of coupling segments 100a,b forming the pipe coupling 110 can be substantially similar to each other. The pipe coupling 110 can be configured to engage a first pipe element 702 (shown in FIG. 7) and a second pipe element 706 (shown in FIG. 7) to couple the first pipe element 702 to the second pipe element 706. Examples of pipe elements can be pipes, nipples, valves, caps, elbows, tees, and any other pipe elements known in the art.

Further, the pipe coupling 110 can be selectively adjustable between a relaxed configuration and a tightened configuration. In the relaxed configuration, as shown in FIG. 1, the pair of pipe segments 100a,b can be coupled together by a fastener 124, with the fastener 124 in a loosened state and the gasket 122 uncompressed. In other aspects, the fastener 124 can be removed in the relaxed configuration. In the tightened configuration, the fastener 124 can be in a tightened state and the gasket 122 can be compressed. The relaxed and tightened configurations of the pipe coupling 110 will be described in further detail below, with reference to FIGS. 5-7. Example aspects of the fastener 124 can be generally mushroom-shaped and can define a dome-shaped 125 head end and a cylindrical tail end 126 extending therefrom. A portion of the tail end 126 can comprise threading. The fastener 124 can also comprise a threaded nut 128 having threading complementary to the threading of the threaded tail end 126.

Figure 2:
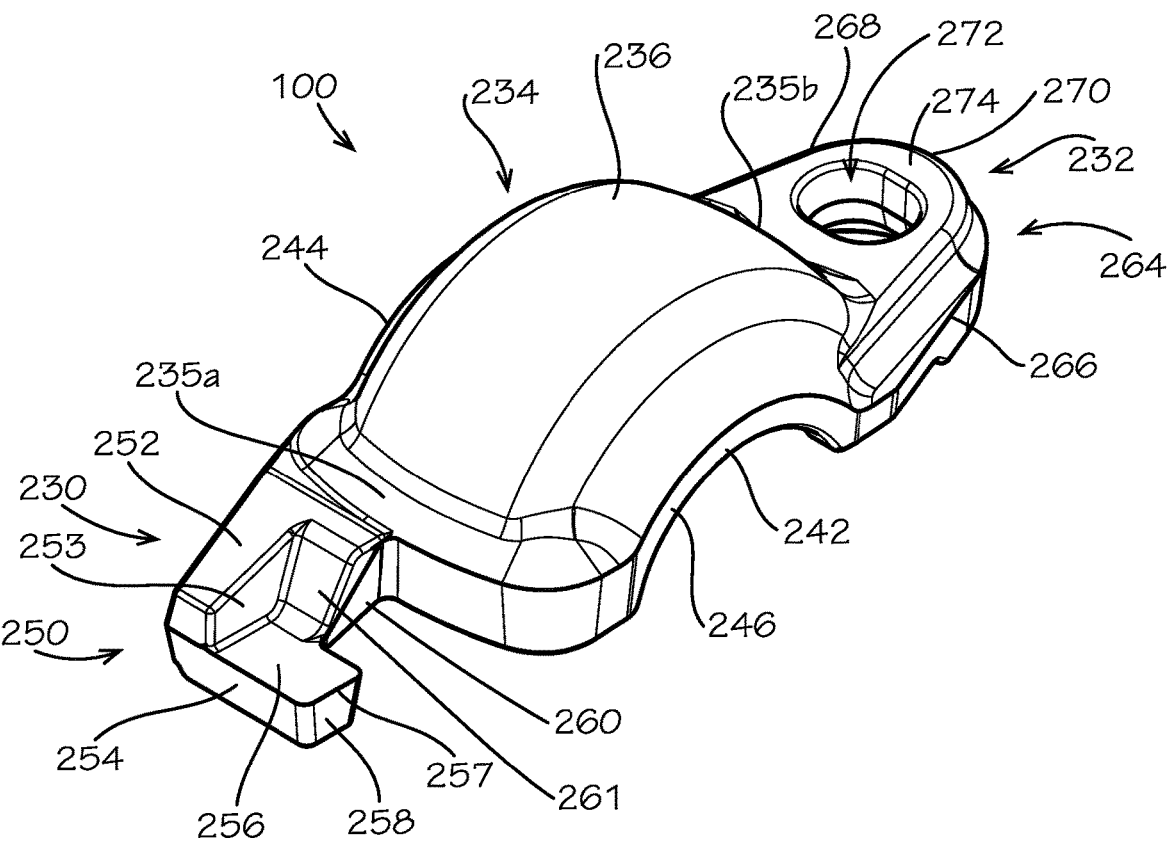
FIG. 2 shows a top perspective view of one of the pair of coupling segments of FIG. 1.
Figure 3:
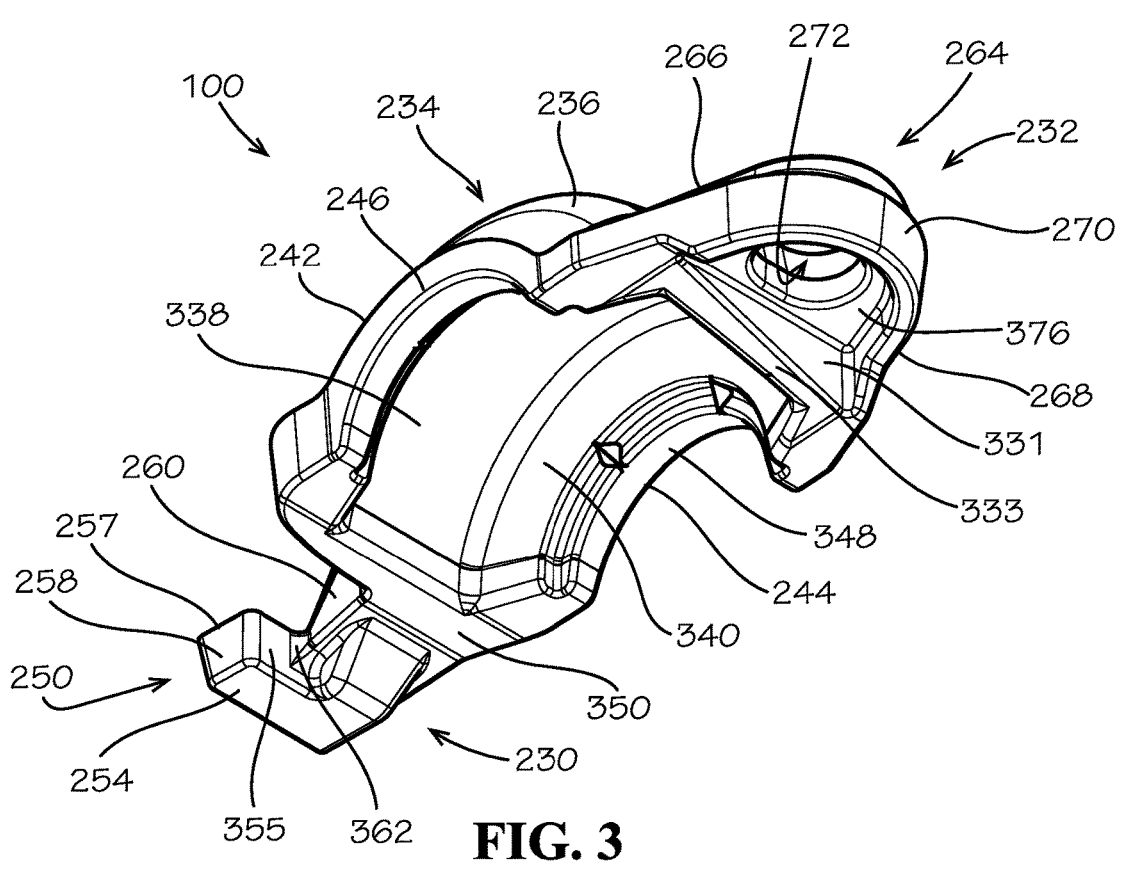
FIG. 3 is bottom perspective view of the coupling segment of FIG. 2.
Figure 4:
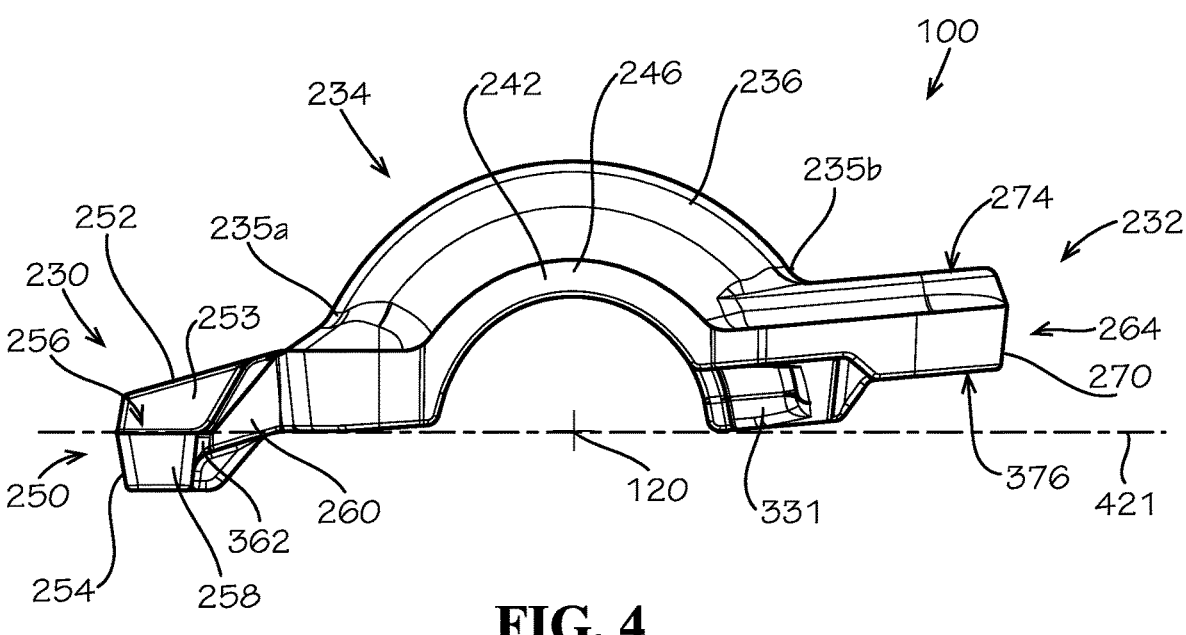
FIG. 4 is a front view of the coupling segment of FIG. 2.

FIGS. 2-4 illustrate various views of the coupling segment 100. FIGS. 2 and 3 illustrate top and bottom perspective views, respectively, of the coupling segment 100, and FIG. 4 illustrates a front view of the coupling segment 100. As shown, the coupling segment 100 can define a first end portion 230, an opposing second end portion 232, and a central portion 234 between the first and second end bodies 230,232. Example aspects of the central portion 234 can define a generally arcuate semi-circular shape, as shown. The coupling segment 100 can further define an outer surface 236 and an inner surface 338 (shown in FIG. 3). As best seen in FIG. 3, the inner surface 338 of the central portion 234 can define a generally semi-cylindrical inner wall 340. The inner wall 340 may or may not be aligned with the axis 120 in some aspects. Moreover, the coupling segment 100 can define a first axial side 242 and a second axial side 244, with the central portion 234 extending from the first axial side 242 to the second axial side 244. According to example aspects, the coupling segment 100 can be formed from a metal material, such as steel or cast iron, including ductile iron in some aspects. In other aspects, the coupling segment 100 can be formed from any material, or a combination of materials, that are known in the art, including but not limited to metal, plastic, resin, synthetic materials, and fibers.

Example aspects of the coupling segment 100 can comprise a generally semi-circular first ridge 246 extending radially inward from the central portion 234, relative to the axis 120, at the first axial side 242. The coupling segment 100 can also comprise a generally semi-circular second ridge 348 extending radially inward from the central portion 234, relative to the axis 120, at the second axial side 244. According to example aspects, and as will be described in further detail below, the first ridge 246 can be configured to engage a groove 704 (shown in FIG. 7) of the first pipe element 702 (shown in FIG. 7), and the second ridge 348 can be configured to engage a groove 708 (shown in FIG. 7) of the second pipe element 706 (shown in FIG. 7) to couple the first pipe element 702 to the second pipe element 706.

According to example aspects, the first end portion 230 of the coupling segment 100 can comprise a hook 250 extending from a first end 235a of the central portion 234. Example aspects of the hook 250 can be substantially L-shaped, and can comprise a shank 252 extending radially outward from the central portion 234, relative to the axis 120 (shown in FIGS. 1 and 4), at or near the second axial side 244. The hook 250 further can comprise a bend 254 extending from an end of the shank 252 distal to the central portion 234. The bend 254 can be oriented at an angle relative to the shank 252. For example, as shown in the depicted aspect, the bend 254 can be oriented substantially orthogonal to the shank 252. In other aspects, however, the angle of the bend 254 relative to the shank 252 can be greater or less than 90°. In example aspects, as shown, the bend 254 can extend axially from the shank 252 towards the first axial side 242 of the coupling segment 100. That is to say, the bend 254 can extend from the shank 252 substantially in the direction of axis 120. However, in other aspects, the bend 254 can extend in a direction different from the direction of axis 120. As shown, example aspects of the shank 252 and bend 254 can be monolithically formed, and example aspects of the shank 252 and central portion 234 can be monolithically formed. In other aspects, the shank 252 can be separately formed from one or both of the bend 254 and central portion 234, and can be coupled to the bend 254 and/or central by a fastener, such as, for example, welding, an adhesive, screws, or any other suitable fastener known in the art. Furthermore, as shown in FIG. 3, the coupling segment 100 can define a contact surface 350 at the first end 235a of the central portion 234 proximate to the hook 250.

In some example aspects, the hook 250 can further comprise a rib 260 for reinforcing the shank 252 relative to the central portion 234 and the bend 254 relative to the shank 252. The rib 260 can extend radially outward from the central portion 234, as shown. In example aspects, the rib 260 can extend along and adjoin a portion of an inner surface 253 of the shank 252. Furthermore, the rib 260 can adjoin and terminate at an inner surface 355 of the bend 254. Example aspects of the rib 260 can define a sloped upper surface 261, such that a height of the rib 260 can taper from the central portion 234 to the bend 254. Moreover, example aspects of the rib 260 can be monolithically formed with the hook 250 and the central portion 234, as shown. In other aspects, however, the rib 260 can be separately formed from one or both of the hook 250 and the central portion 234, and can be attached to the hook 250 and/or central portion 234 by a fastener, such as, for example, welding, an adhesive, screws, or any other suitable known fastener in the art.

Example aspects of the hook 250 can define an inner corner edge 362 (shown in FIG. 3) at the intersection of the rib 260 and the bend 254. The inner corner edge 362 can be filleted in some aspects, as shown. In other aspects, the inner corner edge 362 can be chamfered or can be a sharp edge. In some aspects, the angle formed at the inner corner edge 362 can be an about right angle, as shown. In other aspects, the angle formed at the inner corner edge 362 can be an obtuse angle or an acute angle.

In example aspects, such as the aspect depicted in FIGS. 1-7, the bend 254 can define a substantially planar engagement surface 256. As shown, the engagement surface 256 can be oriented at an obtuse angle relative to the inner surface 253 of the shank 252. In other aspects, the angle formed between the inner surface 253 of the shank 252 and the engagement surface 256 can be acute or can be a right angle. The engagement surface 256 can face upward, relative to the orientation shown in FIG. 4, and can be substantially co-planar with the axis 120. For example, the engagement surface 256 and axis 120 can lie in a plane 421, as shown in FIG. 4. (Plane 421 extends into the page.) The bend 254 can further define a hook end surface 258 extending generally downward and away from the engagement surface 256 at a distal end 257 of the bend 254, relative to the orientations shown in FIG. 4. Example aspects of the hook end surface 258 can be oriented at an acute angle relative to the engagement surface 256 in some aspects. In other aspects, the hook end surface 258 can extend from the engagement surface 236 at a right or obtuse angle.

Example aspects of the second end portion 232 of the coupling segment 100 can define a fastener lug 264 extending radially outward from a second end 235b of the central portion 234. The second end 235b of the central portion 234 can be opposite the first end 235a of the central portion 234. The fastener lug 264 can, in example aspects, define a front side 266 and a rear side 268. The front and rear sides 266,268 of the fastener lug 264 can taper towards one another away from the central portion 234 and can terminate at an arcuate distal end 270. In example aspects, the fastener lug 264 can define a fastener opening 272 extending from a top surface 274 of the fastener lug 264 to a bottom surface 376 (shown in FIG. 3) of the fastener lug 264.

Example aspects of the second end portion 232 further can define a ledge 331 (shown in FIG. 3) extending from the bottom surface 376 of the fastener lug 264 adjacent the second end 235b of the central portion 234. Thus, example aspects of the ledge 331 can extend in a generally downward direction from the fastener lug 264, relative to the orientation shown in FIG. 4. As shown, the ledge 331 can be oriented about orthogonal to the fastener lug 264. In other aspects, the ledge 331 can be oriented at a different angle relative to the fastener lug 264. Furthermore, as shown in FIG. 3, some example aspects of the ledge 331 can define a ramped ledge surface 333 distal from the fastener lug 264. Other example expects of the coupling segment 100 may not define the ledge 331.

Figure 6:
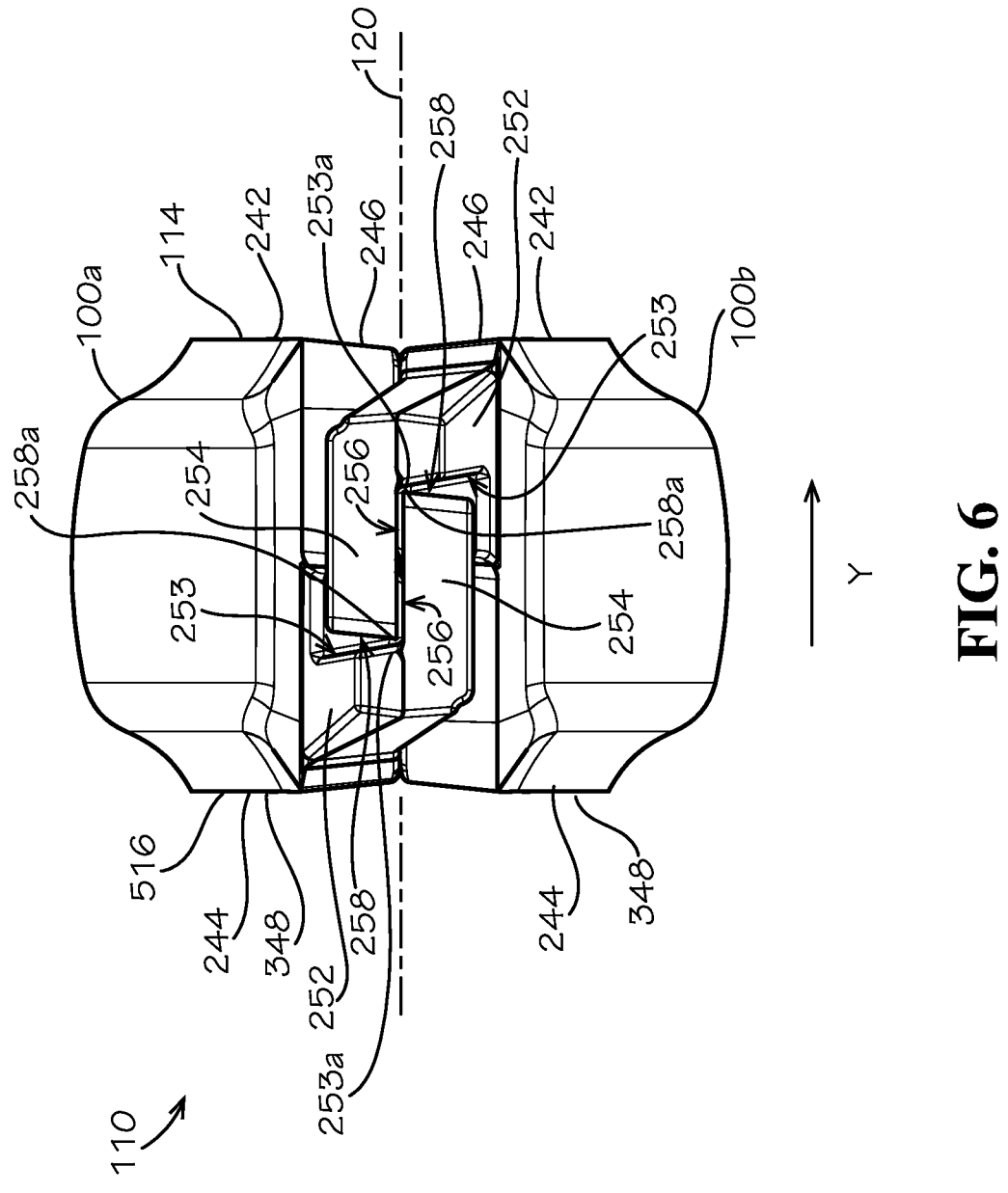
FIG. 6 is a side view of the pipe coupling of FIG. 1 facing first ends of the pair of coupling segments.
Figure 7:
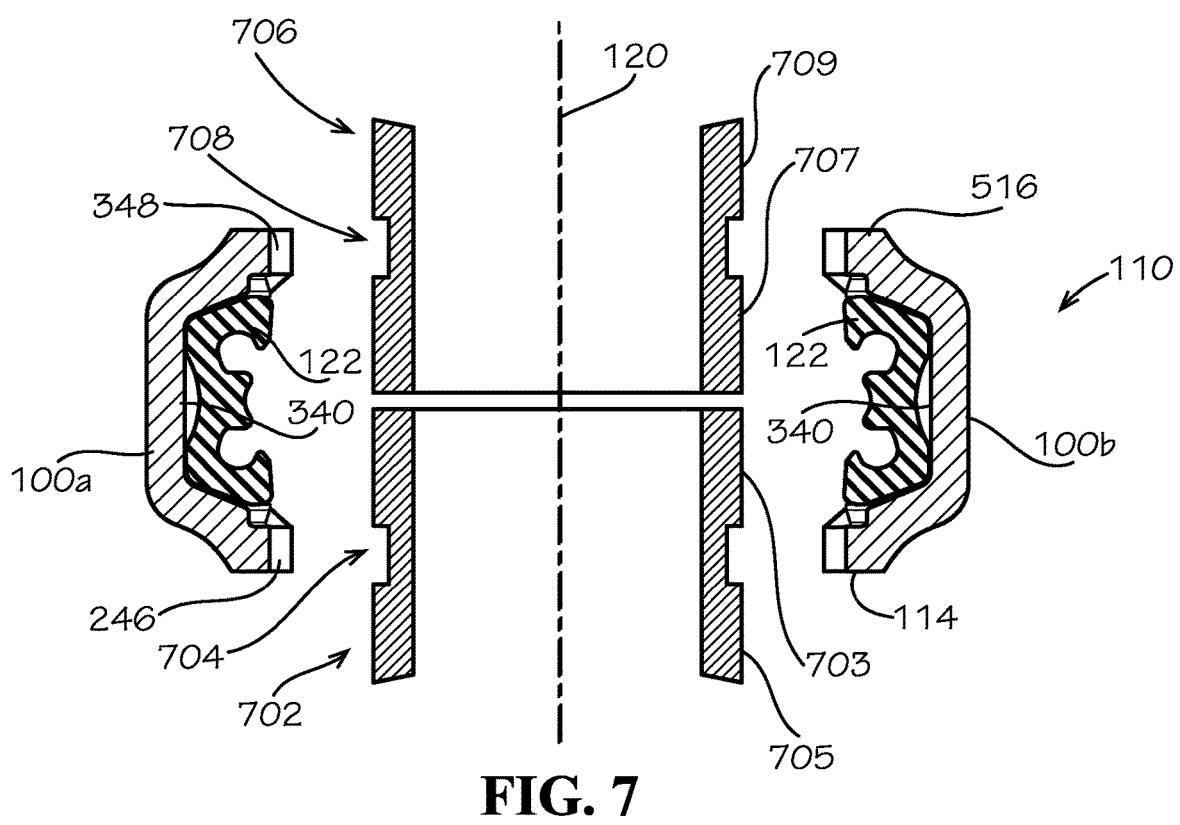
FIG. 7 is an exploded, cross-sectional view of the pipe coupling of FIG. 1 with a first pipe element and a second pipe element.
Figure 8:
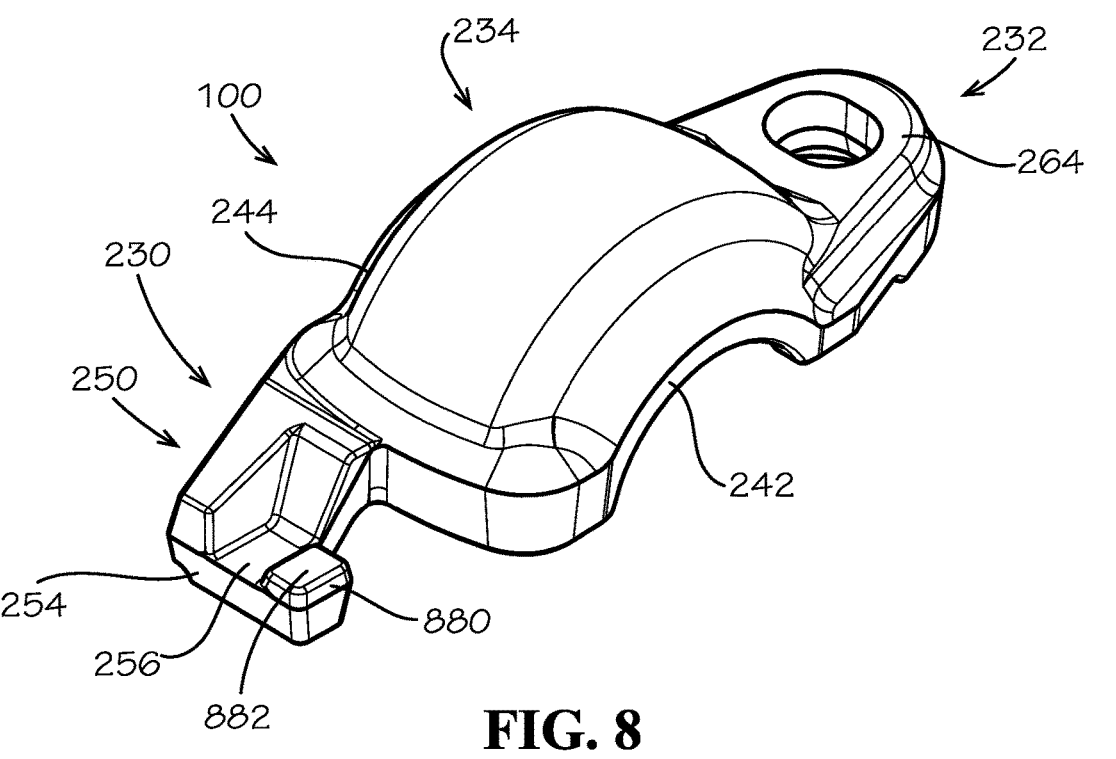
FIG. 8 is a top perspective view of the coupling segment in accordance with another aspect of the present disclosure.

Referring to FIGS. 5-7, a pair of the coupling segments 100a,b can be provided to form the pipe coupling 110. As noted above, in other aspects, the pipe coupling 110 can comprise additional coupling segments 100, as desired by a manufacturer of the pipe coupling 110. As shown, the first coupling segment 100a can align with and engage the second coupling segment 100b. To align and engage the first and second coupling segments 100a,b, the bend 254 of the second coupling segment 100b can be slid over the bend 254 of the first coupling segment 100a, relative to the orientation shown in FIG. 6, such that the engagement surfaces 256 of the bends 254 can be aligned and in facing contact. As shown, the engagement surface 256 of the second coupling segment 100*b* can rest on and lie parallel with the engagement surface 256 of the first coupling segment 100*a*. The abutment of the engagement surfaces 256 can prohibit rotational movement of the first coupling segment 100*a* relative to the second coupling segment 100*b* in the direction X.

Additionally, in some aspects, the hook end surface 258 of the first coupling segment 100*a*, or a portion thereof, can contact the inner surface 253 of the shank 252 of the second coupling segment 100*b*. For example, as shown, a lower edge 258*a* of the hook end surface 258 can abut a lower edge 253*a* of the inner surface 253 of the shank 252. Similarly, the hook end surface 258 of the second coupling segment 100*b*, or a portion thereof, can contact the inner surface 253 of the shank 252 of the first coupling segment 100*a*. In example aspects, the inner surfaces 253 of the shanks 252 can serve as stops to properly locate the first coupling segment 100*a* relative to the second coupling segment 100*b* and to prohibit further lateral movement of the first coupling segment 100*a* relative to the second coupling segment 100*b* in the direction Y.

Furthermore, the fastener lug 264 of the first coupling segment 100*a* can be slid over the fastener lug 264 of the second coupling segment 100*b*, such that the fastener openings 272 of the fastener lugs 264 are aligned. With the hooks 250 in alignment and the fastener lugs 264 in alignment, the first axial sides 242 of the coupling segments 100*a,b* can be aligned and the second axial sides 244 of the coupling segments 100*a,b* can be aligned. The first axial sides 242 can define the first axial side 114 of the pipe coupling 110, and the second axial sides 244 can define the second axial side 516 of the pipe coupling 110.

The semi-cylindrical inner walls 340 of the coupling segments 100*a,b* can together define the void 118. According to example aspects, the gasket 122 (shown in FIGS. 1 and 7) can be positioned within the void 118 of the pipe coupling 110 between the first and second ridges 246,348 of the coupling segments 100*a,b*. Example aspects of the gasket 122 can be formed from a rubber material, or any other suitable material known in art, including, but not limited to, silicone, cork, and neoprene.

The fastener 124 can be provided to secure the coupling segments 100*a,b* together. In example aspects, as shown, the fastener 124 can be a track bolt. In other aspects, the fastener 124 can be a clip, rivet, snap, adhesive, weld, screw, or any other suitable fastener known in the art. The tail end 126 of the fastener 124 can extend through the fastener openings 272 of the fastener lugs 264, with the head end 125 of the fastener 124 abutting the top surface 274 of the fastener lug 264 of the first coupling segment 100*a*. The threaded nut 128 can be threaded with the tail end 126 of the fastener 124 and can be tightened against the top surface 274 of the fastener lug 264 of the second coupling segment 100*b*. Example aspects of the fastener 124 and nut 128 can be formed from any suitable material, including, but not limited to, metal, such as steel, and plastic.

In a relaxed configuration (shown in FIG. 1) of the pipe coupling 110, the nut 128 can be loosened on the tail end 126 of the fastener 124, and the coupling segment 100*a* can remain coupled to the coupling segment 100*b*. With the coupling segments 100*a,b* coupled together in the relaxed configuration, the gasket 122 can be retained within the void 118 between first ridges 246 and second ridges 348 of the coupling segments 100*a,b*. The interference of the first and second ridges 246,348 with the gasket 122 can also prohibit axial movement of the coupling segments 100*a,b*. Furthermore, in example aspects, the gasket 122 can bias the coupling segments 100*a,b* apart in the relaxed configuration to apply a preload tension to the hooks 250 by pressing the opposing engagement surfaces 256 together and to allow a large enough void 118 to receive the first and second pipe elements 702, 706 (shown in FIG. 7) during installation. Furthermore, in the relaxed configuration, the ledges 331 of the second end bodies 232 of the coupling segments 100*a,b* can be spaced apart.

In the tightened configuration (shown in FIG. 5), the nut 128 can be tightened on the tail end 126 of the fastener 124, bringing the ledges 331 closer together, and in some aspects, bringing the ramped surfaces 333 of the ledges 331 into contact with one another. Furthermore, in some aspects, the ramped surfaces 333 can be pressed against one another in the tightened configuration. Moreover, in the tightened configuration, the contact surfaces 350 (shown in FIG. 3) of the coupling segments 100*a,b* can be pressed against one another to reduce stress on the adjacent hooks 250. Deformation of the couplings segments 100*a,b* around the pipe elements 702,706 may occur in some aspects, and may not occur in other aspects.

FIG. 7 illustrates an exploded cross-sectional view of the pipe coupling 110 with the first pipe element 702 and second pipe element 706, also in cross-section. In example aspects, an end 703 of the first pipe element 702 can be received within the void 118 (shown in FIGS. 1 and 5) adjacent the first axial side 114 of the pipe coupling 110, and an end 707 of the second pipe element 706 can be received within the void 118 adjacent the second axial side 516 of the pipe coupling 110. The groove 704 formed in the first pipe element 702 can define a generally annular groove extending inward from an outer surface 705 of the first pipe element 702. The groove 704 of the first pipe element 702 can be engaged by the first ridges 246 of the coupling segments 100*a,b*. Similarly, the groove 708 of the second pipe element 706 can be engaged by the second ridges 348 of the coupling segments 100*a,b*. The engagement of the first ridges 246 and second ridges 348 with the grooves 704,708, respectively, can retain the pipe coupling 110 on the corresponding ends 703,707 of the first and second pipe elements 702,706, respectively. Furthermore, in example aspects, the gasket 122 can be configured to engage the ends 703,707 of the first and second pipe elements 702,706, respectively, to create an improved grip on the first and second pipe elements 702,706 and to create a leak-proof seal preventing fluid in the first and second pipe elements 702,706 from leaking at the pipe coupling 110.

Referring to FIGS. 5-7, a method of attaching the pipe coupling 110 to the first and second pipe elements 702,706 can comprise aligning the coupling segments 100*a,b* around the ends 703,707 of the first and second pipe elements 702,706. The engagement surfaces 256 of the hooks 250 of the coupling segments 100*a,b* can be aligned and in facing contact with one another, and the first ridges 246 and second ridges 348 can be aligned with the grooves 704,704 of the first and second pipe elements 702,706, respectively. The fastener lugs 264 can be aligned, and the tail end 126 of the fastener 124 can be received through the fastener openings 272. The nut 128 of the fastener 124 can be tightened to engage the first and second ridges 246,348 with the grooves 704,708 of the first and second pipe elements 702,706, and to compress the gasket 122 between the coupling segments 100*a,b* to engage the gasket 122 with the ends 703,707 of the pipe elements 702,706. In example aspects, compressing the gasket 122 can comprise moving the ledges 331 of the second end bodies 232 closer together, and in some aspects can comprise pressing the ramped surfaces 333 of the ledges 331 against one another. The engagement between the gasket 122 and the ends 703,707 of the first and second pipe elements 702,706 and the engagement of the first and second ridges 246,348 with the grooves 704,708 of the pipe elements 702,706 can prohibit removal of the ends 703,707 of the pipe elements 702,706 from the pipe coupling 110.

In other aspects, a method of attaching the pipe coupling 110 to the first and second pipe elements 702,704 can comprise aligning the coupling segments 100a,b around the end 703 of the first pipe element 702. The pipe coupling 110 can be retained on the end 703 of the first pipe element 702 while the coupling 110 is in the relaxed configuration. For example, in the relaxed configuration, the first ridges 246 can interfere with the groove 704 of the first pipe element 702 and/or the gasket 122 can interfere with the end 703 of the first pipe element 702 to retain the coupling 110 on the first pipe element 702. The end 707 of the second pipe element 706 can then be inserted into the void 118 of the pipe coupling 110 at the second axial side 516 of the coupling, with the coupling 110 still in the relaxed configuration. The pipe coupling 110 can be secured to the second pipe element 706 by the tightening of the fastener 124, such that the coupling 110 is in the tightened configuration, with the second ridges 348 engaging the groove 708 of the second pipe element 706. Example aspects of the gasket 122 can also engage the end 707 of the second pipe element 706 in the tightened configuration.

In still other aspects, the coupling segments 100a,b can be coupled together in the relaxed configuration, with the fastener 124 in a loosened state, and the coupling 110 can be installed on the first and second pipe elements 702,706 by a method similar to the installation method described in U.S. application Ser. No. 16/117,835. For example, the end 703 of the first pipe element 702 can be inserted into the void 118 of the pipe coupling 110 at the first axial side 114 of the coupling 110, and the coupling 110 can be forced onto the first pipe element 702. In some aspects, the entire coupling 110 can be forced past the groove 704 of the first pipe element 702. In other aspects, at least the first ridges 246 of the coupling segments 100a,b can be forced past the groove 704. The end 707 of the second pipe element 706 can then be aligned in a facing relationship with the end 703 of the first pipe element 702, with the end 707 of the second pipe element 706 oriented at the second axial side 516 of the coupling 110. The coupling 110 can then be slid partially onto the second pipe element 706, such that the first ridges 246 are aligned with the groove 704 of the first pipe element 702 and the second ridges 348 are aligned with the groove 708 of the second pipe element 706. The fastener 124 can be tightened to engage the first and second ridges 246,348 with the grooves 704,708 of the first and second pipe elements 702,706, respectively, to retain the coupling 110 on the ends 703,707 of the pipe elements 702,706 in the tightened configuration. In example aspects, the gasket 122 can also engage the ends 703,707 of the pipe elements 702,706 when compressed in the tightened configuration.

FIGS. 8-11 illustrate another aspect of the coupling segment 100 and another aspect of the pipe coupling 110 comprising a pair of the coupling segments 100a,b, in accordance with the present disclosure. As shown, in the present aspect, the coupling segment 100 can comprise a projection 880 extending from the engagement surface 256 of the bend 254, at or near the distal end 257 of the bend 254 (shown in FIG. 2). The projection 880 can extend in a generally upward direction from the engagement surface

Figure 9:
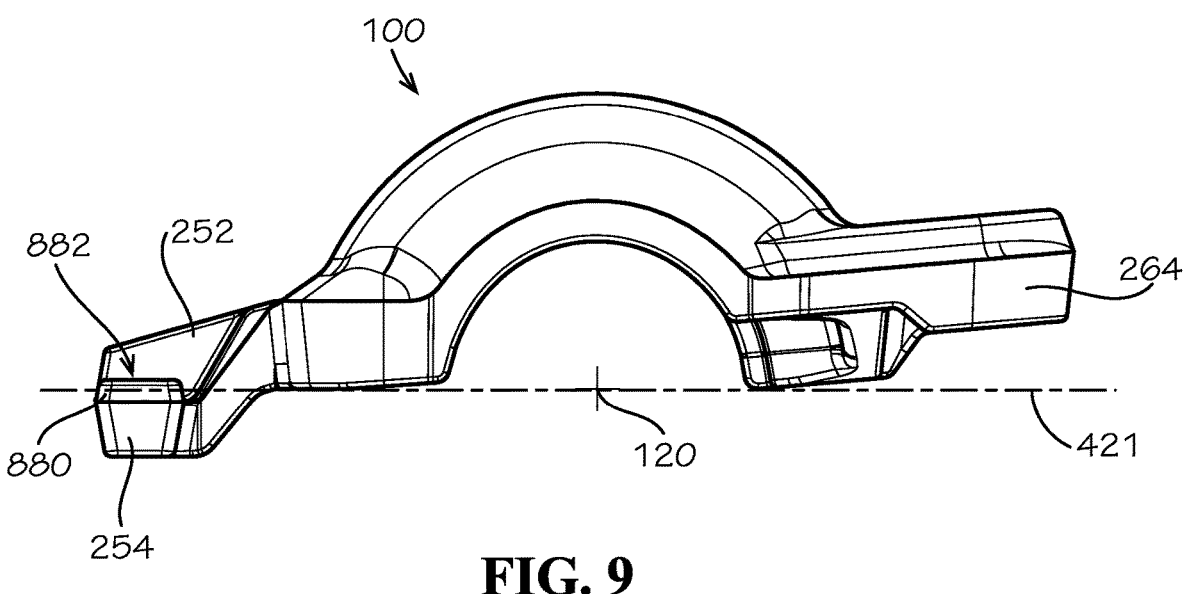
FIG. 9 is a front view of the coupling segment of FIG. 8.
Figure 10:
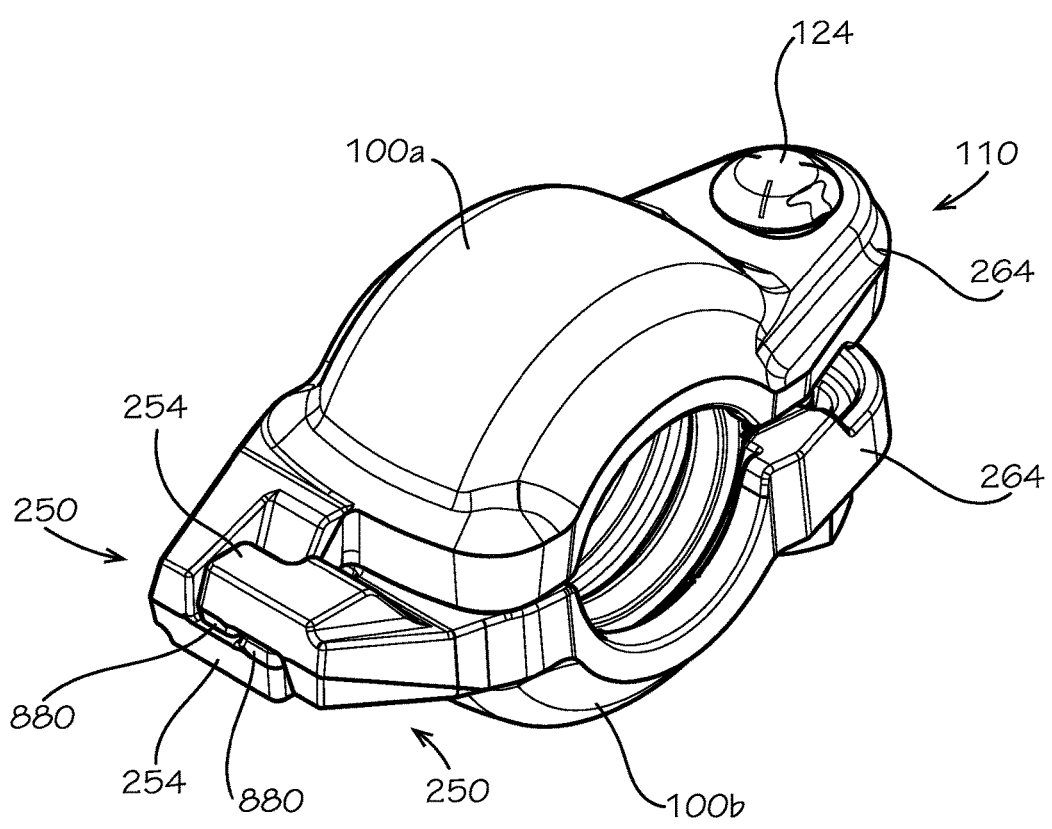
FIG. 10 is a top perspective view of a pipe coupling in accordance with another aspect of the present disclosure, the pipe coupling comprising a pair of the coupling segments of FIG. 8.
Figure 11:
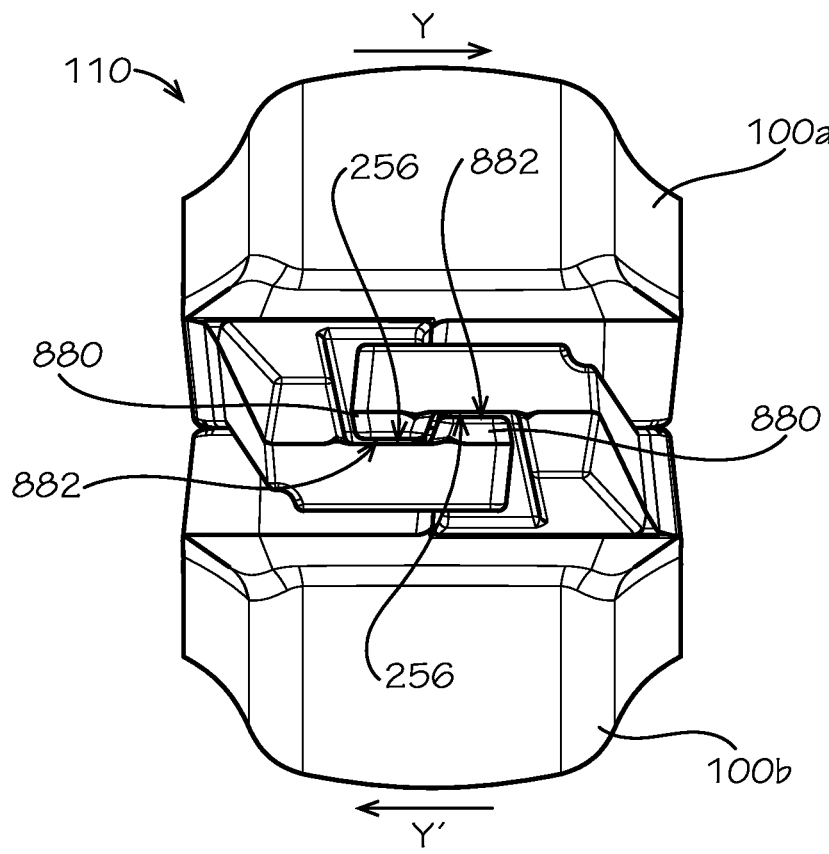
FIG. 11 is a side view of the pipe coupling of FIG. 10 facing first ends of the pair of coupling segments.

256, relative to the orientation shown in FIGS. 9 and 11. As shown, example aspects of the projection 880 can be formed as a truncated rectangular pyramid defining a top truncated surface 882. The top truncated surface 882 can extend about parallel to the engagement surface 256. In other aspects, the top truncated surface 882 can be oriented at an angle relative to the engagement surface 256. Furthermore, in other aspects, the projection 880 can be formed as another shape, such as, for example, a hemisphere, a non-truncated rectangular pyramid, a truncated or non-truncated triangular pyramid, a cube, or another other suitable shape.

With the first and second coupling segments 100a,b aligned as described above with reference to the pipe coupling 110 of FIGS. 1-7, the top truncated surface 882 of the projection 880 of the first coupling segment 100a can abut the engagement surface 256 of the second coupling segment 100b. Similarly, the top truncated surface 882 of the projection 880 of the second coupling segment 100a can abut the engagement surface 256 of the first coupling segment 100a. As such, as best seen in FIG. 11, the projections 880 of the first and second coupling segments 100a,b can be axially aligned with one another. The engagement of the projections 880 with the engagement surfaces 264 can serve to properly locate the first coupling segment 100a relative to the second coupling segment 100b. Further, the projections can interfere with one another to prohibit lateral movement of the first coupling segment 100a relative to the second coupling segment 100b in the direction Y', opposite the direction Y.

Figure 12:
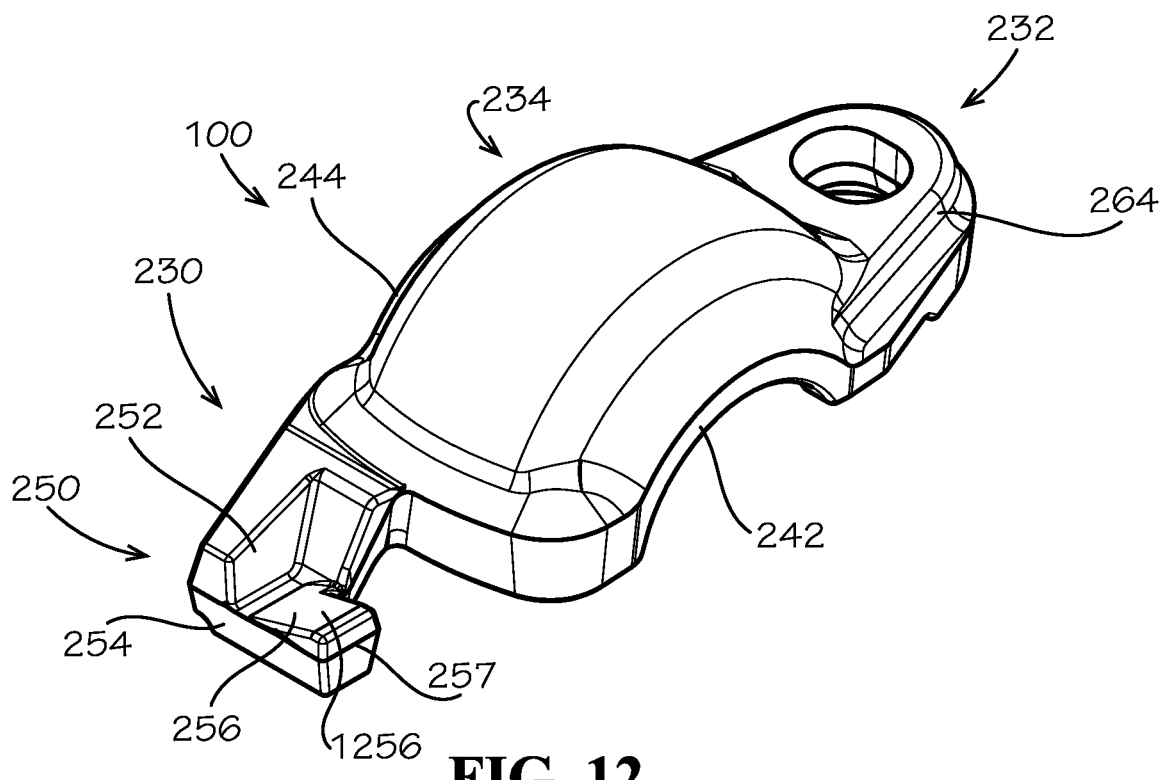
FIG. 12 is a top perspective view of the coupling segment in accordance with another aspect of the present disclosure.
Figure 13:
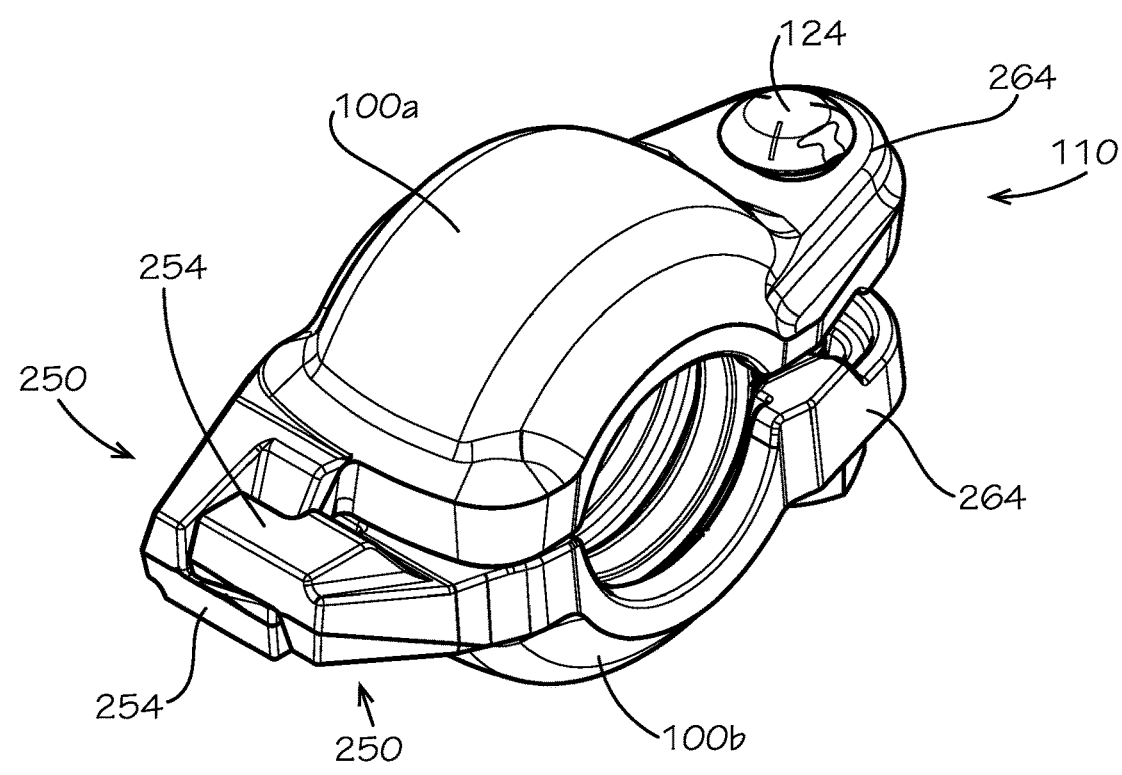
FIG. 13 is a top perspective view of a pipe coupling in accordance with another aspect of the present disclosure, the pipe coupling comprising a pair of the coupling segments of FIG. 12.
Figure 14:
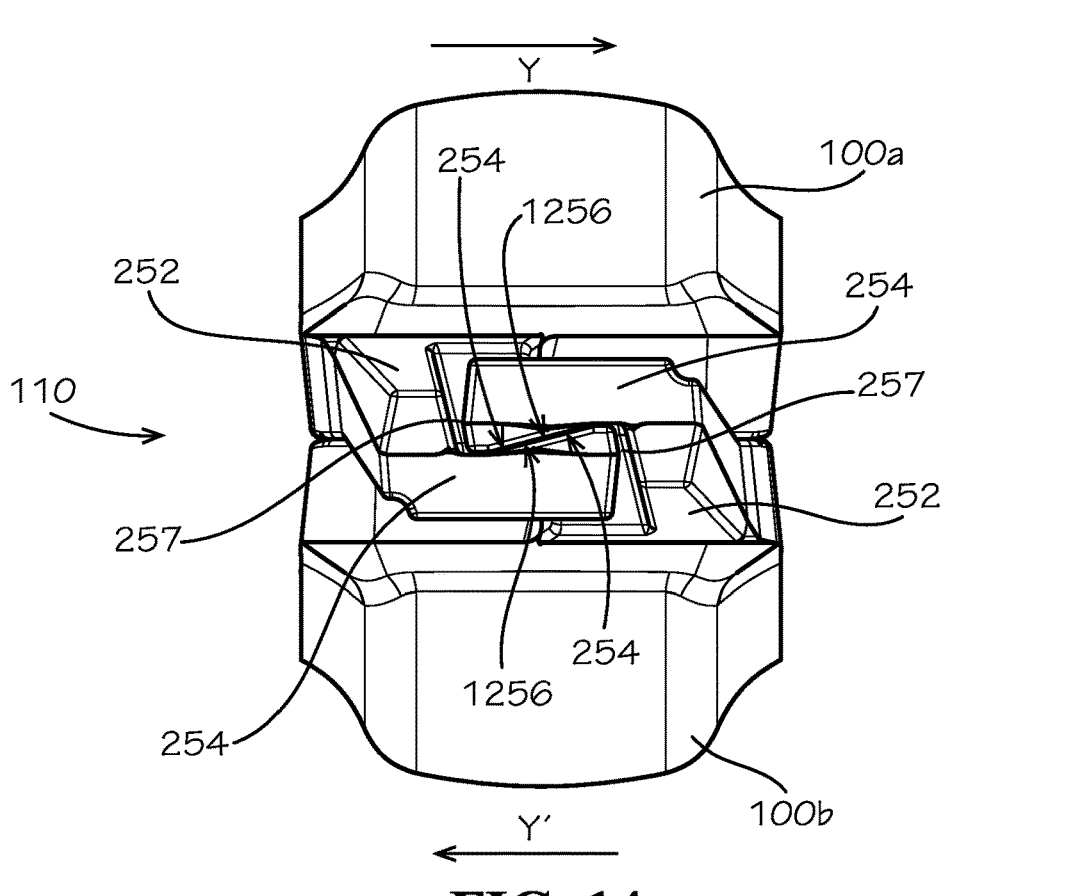
FIG. 14 is a side view of the pipe coupling of FIG. 13 facing first ends of the pair of coupling segments.

FIGS. 12-14 illustrate another aspect of the coupling segment 100 and another aspect of the pipe coupling 110, in accordance with the present disclosure. The pipe coupling 110 again can be formed by a pair of the coupling segments 100a,b. The coupling segment 100 can be similar to the coupling segment 100 of FIGS. 1-7 and coupling segment 100 of FIGS. 8-11. As shown in FIGS. 9-12, the engagement surface 256 of the coupling segment 100 can define a ramped engagement surface 1256, defining an incline from the shank 252 to the distal end 257 of the bend 254. As such, a height of the bend 254 can be increase from the shank 252 to the distal end 257. With the first and second coupling segments 100a,b aligned as described above with reference to the pipe coupling 110 of FIGS. 1-7, the ramped engagement surface 1256 of the first coupling segment 100a can abut the ramped engagement surface 1256 of the second coupling segment 100b, such that the ramped engagement surfaces 1256 are oriented parallel to one another. In example aspects, interference between the ramped engagement surfaces 1256 can aid in preventing lateral movement of the first coupling segment 100a relative to the second coupling segment 100b in the direction Y'.

Figure 15:
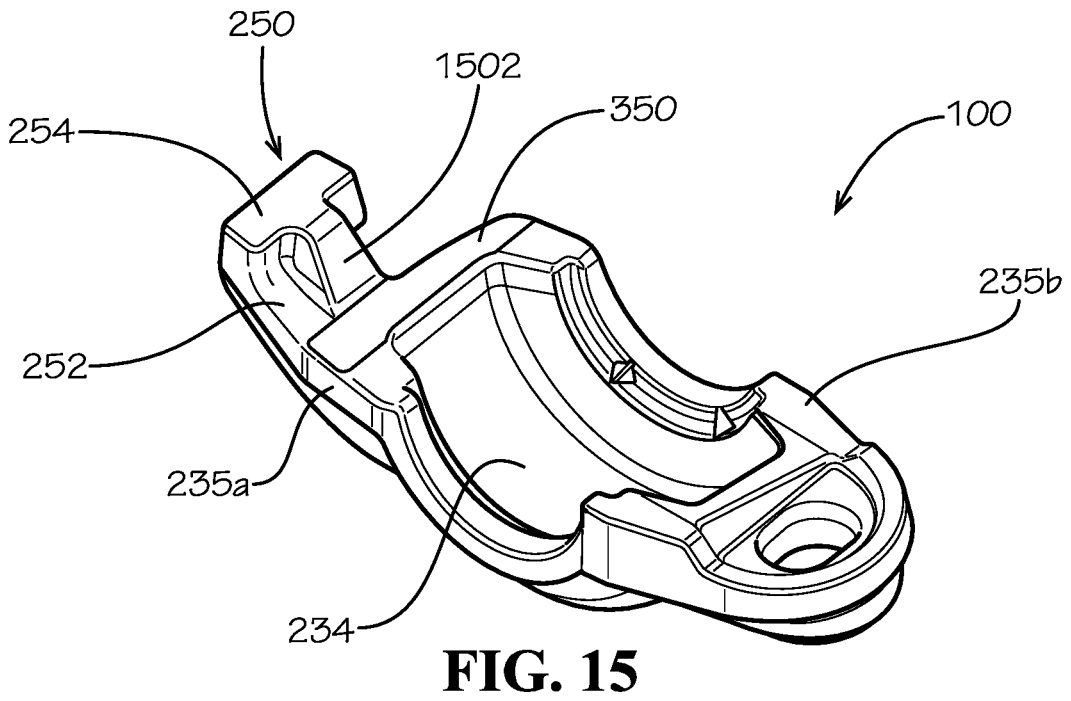
FIG. 15 is a top perspective view of the coupling segment according to another aspect of the present disclosure.

FIG. 15 illustrates another aspect of the coupling segment 100. As shown, similar to the aspect of FIGS. 1-4, the coupling segment 100 can define a contact surface 350 located at the first end 235a of the central portion 234 proximate to the hook 250. Example aspects of the contact surface 350 can define a substantially smooth, planar surface. Furthermore, the present aspect can define a stabilizer 1502 extending between the first end 235a of the central portion and the bend 254, as shown, to provide support to the hook 250 when stresses are applied in the tightened configuration, as will be described in further detail below.

Figure 16:
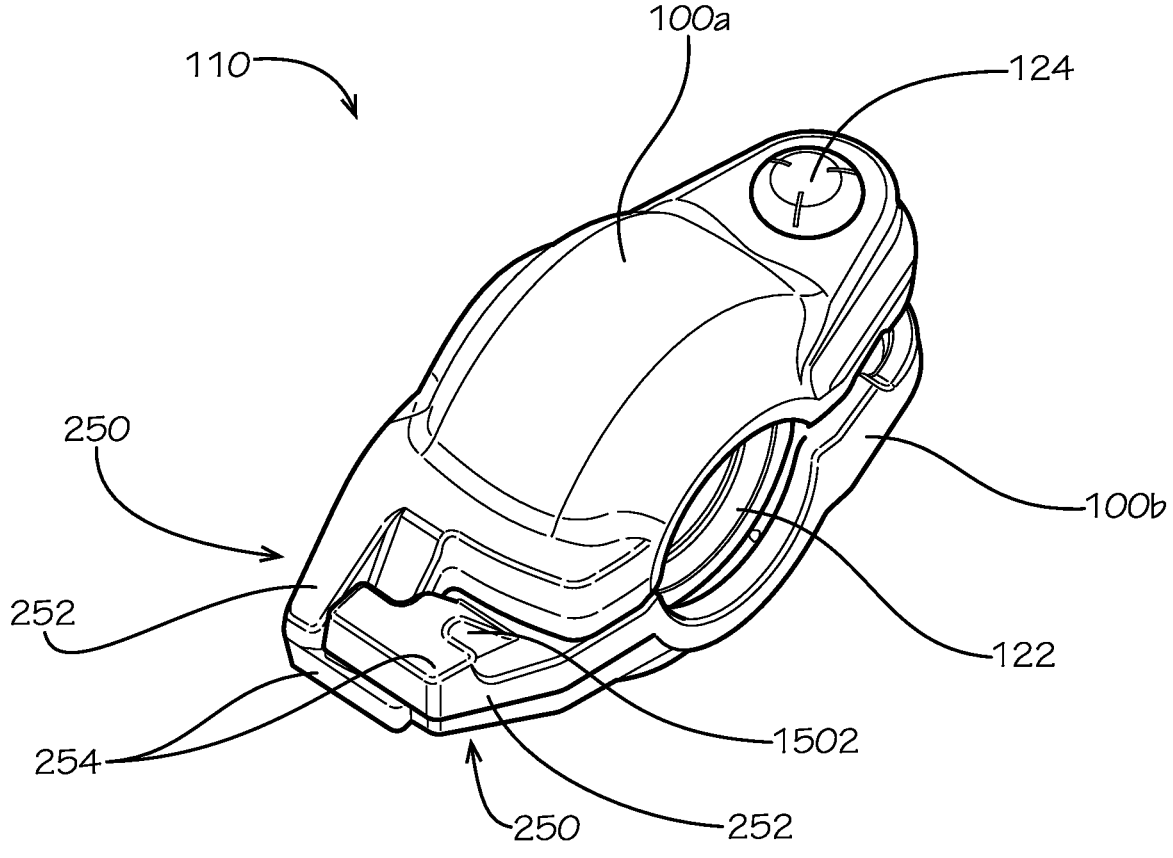
FIG. 16 is a top perspective view of the pipe coupling according to another aspect of the present disclosure, the pipe coupling comprising a pair of the coupling segments of FIG. 15.
Figure 17:
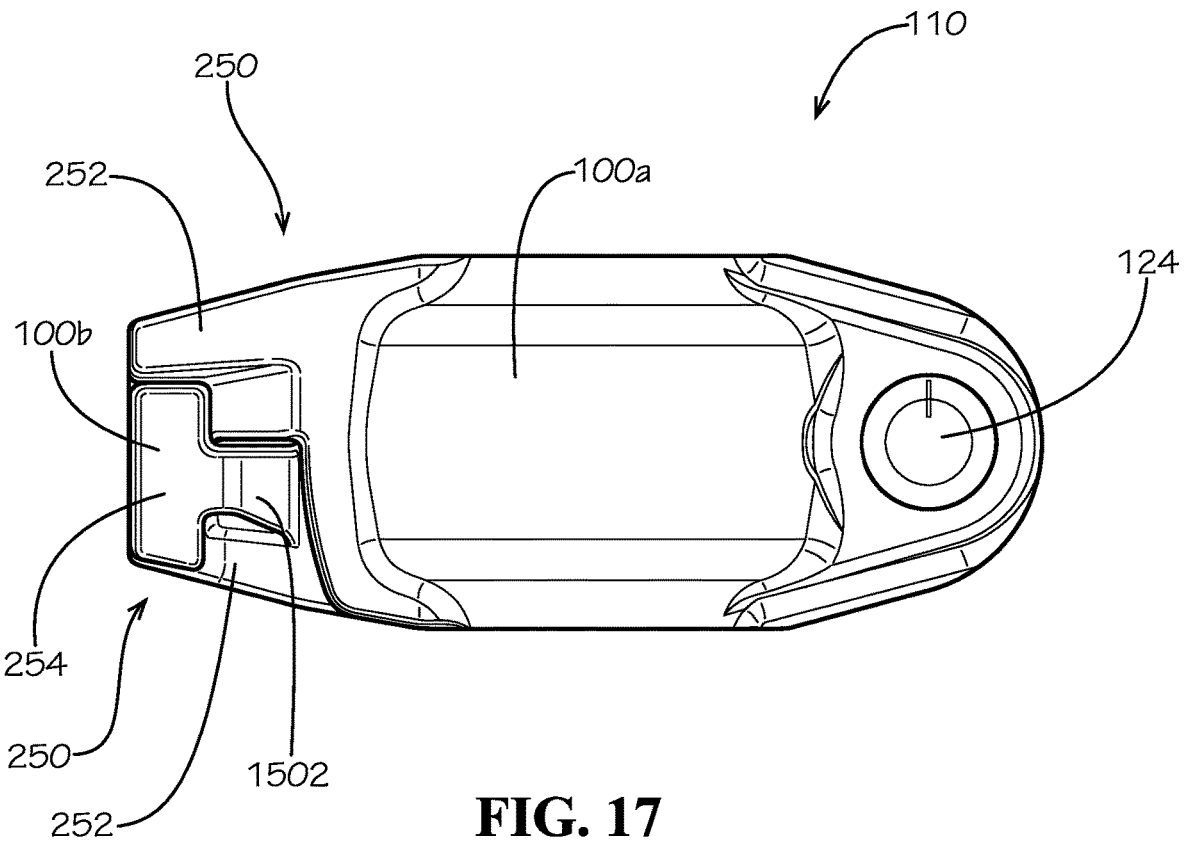
FIG. 17 is a top view of the pipe coupling of FIG. 16.

FIGS. 16 and 17 illustrate another example aspect of the pipe coupling 110 comprising a pair of the coupling segments 100a,b of FIG. 15. The engagement surfaces 256 (shown in FIG. 2) of the hooks 250 can be in facing contact, as shown. Similar to the coupling segments 100a,b of FIGS.

12-14, each of the present coupling segments 100*a,b* can define a ramped engagement surface 1256 (shown in FIG. 12), defining an incline from the shank 252 to the distal end 257 (shown in FIG. 2) of the bend 254. In example aspects, interference between the ramped engagement surfaces 1256 can aid in preventing lateral movement of the first coupling segment 100*a* relative to the second coupling segment 100*b* in the direction Y' (shown in FIG. 14). Furthermore, the gasket 122 can be received between the coupling segments 100*a,b*, and can bias the coupling segments 100*a,b* apart in the relaxed configuration. Biasing the coupling segments 100*a,b* apart can apply a pre-load tension to the hooks 250 by pressing the opposing ramped engagement surfaces 1256 against each other.

The fastener 124 can be tightened to compress the gasket 122 and to orient the pipe coupling 110 in the tightened configuration. In the tightened configuration, the contact surfaces 350 (shown in FIG. 15) can be pressed into one another to reduce the stress in the adjacent hooks 250. Furthermore, the stabilizers 1502 can be configured to bear a portion of the stress in the hooks 250 to reduce the stress in vulnerable areas (e.g., thinner areas) of the hooks 250 when the coupling 110 is in the tightened configuration.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A hooked pipe coupling comprising:
a first pipe coupling segment comprising a first arcuate body portion defining a first end and a second end opposite the first end, a first hook extending from the first end, and a first fastener lug extending from the second end, the first arcuate body portion defining a first sloped ledge surface; and
a second pipe coupling segment comprising a second arcuate body portion defining a third end and a fourth end opposite the third end, a second hook extending from the third end, and a second fastener lug extending from the fourth end, the second arcuate body portion defining a second sloped ledge surface;
wherein the first sloped ledge surface presses against the second sloped ledge surface in a tightened configuration of the hooked pipe coupling, wherein:
the first pipe coupling segment defines a first axial side and a second axial side opposite the first axial side;
the second pipe coupling segment defines a third axial side aligned with the first axial side and a fourth axial side opposite the third axial side and aligned with the second axial side;
the first sloped ledge surface is sloped downward and away from the first fastener lug in a direction extending from the first axial side to the second axial side;
the second sloped ledge surface is sloped upward and away from the second fastener lug in a direction extending from the fourth axial side to the third axial side;
the first hook defines a first shank portion and a first bend portion, the first shank portion extends in a substantially radially outward direction from the first arcuate body portion, and the first bend portion extends from the first shank portion toward the first axial side; and
the second hook defines a second shank portion and a second bend portion, the second shank portion extends in a substantially radially outward direction from the second arcuate body portion, and the second bend portion extends from the second shank portion toward the fourth axial side.

2. The hooked pipe coupling of claim 1, wherein each of the first sloped ledge surface and the second sloped ledge surface are substantially planar.

3. The hooked pipe coupling of claim 2, wherein, in a relaxed configuration of the hooked pipe coupling, the first sloped ledge surface is spaced apart from the second sloped ledge surface.

4. The hooked pipe coupling of claim 3, wherein a fastener extends through each of the first fastener lug and the second fastener lug, and wherein the fastener is tightened to reconfigure the hooked pipe coupling from the relaxed configuration to the tightened configuration.

5. The hooked pipe coupling of claim 4, wherein the fastener comprises a threaded bolt and a threaded nut rotatably mounted on the threaded bolt.

6. The hooked pipe coupling of claim 1, wherein the first bend portion defines a first engagement surface, and wherein the second bend portion defines a second engagement surface confronting the first engagement surface.

7. The hooked pipe coupling of claim 6, wherein:
the first bend portion defines a first projection extending from the first engagement surface;
the second bend portion defines a second projection extending from the second engagement surface; and
the first projection is configured to engage the second projection to further prevent axial movement of the first pipe coupling segment relative to the second pipe coupling segment.

8. The hooked pipe coupling of claim 6, wherein the first engagement surface defines a first sloped portion angled rearwardly towards the first shank portion, and wherein the second engagement surface defines a second sloped portion angled forwardly towards the second shank portion.

* * * * *